(12) United States Patent
Aksu (10) Patent No.: US 9,516,549 B1
(45) Date of Patent: Dec. 6, 2016

(54) SHARED SPECTRUM LOAD BALANCING BASED ON NETWORK LOAD

(71) Applicant: Verizon Patent and Licensing Inc., Arlington, VA (US)

(72) Inventor: Arda Aksu, Martinez, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/747,404

(22) Filed: Jun. 23, 2015

(51) Int. Cl.
*H04W 72/00* (2009.01)
*H04W 28/08* (2009.01)
*H04W 16/14* (2009.01)
*H04W 24/10* (2009.01)
*H04W 72/04* (2009.01)
*H04W 88/08* (2009.01)

(52) U.S. Cl.
CPC ............ *H04W 28/08* (2013.01); *H04W 16/14* (2013.01); *H04W 24/10* (2013.01); *H04W 72/0453* (2013.01); *H04W 88/08* (2013.01)

(58) Field of Classification Search
CPC ...... H04W 16/02; H04W 16/14; H04W 16/18; H04W 16/32; H04W 72/00; H04W 72/04; H04W 72/08; H04W 24/02; H04W 28/08; H04W 36/00; H04W 72/0426; H04W 72/048; H04W 88/08; H04W 48/18
USPC ......................... 455/446, 447, 448, 449, 450, 452.1,455/452.2, 453, 512, 513
See application file for complete search history.

(56) References Cited

U.S. PATENT DOCUMENTS

| | | | | |
|---|---|---|---|---|
| 2006/0128311 A1* | 6/2006 | Tesfai | ............... | G01S 5/0252 455/67.11 |
| 2013/0086279 A1* | 4/2013 | Archer | ............... | H04L 69/14 709/233 |
| 2014/0128088 A1* | 5/2014 | Farhadi | ............... | H04W 16/14 455/452.1 |
| 2014/0153546 A1* | 6/2014 | Kim | ............... | H04W 48/18 370/332 |
| 2014/0355570 A1* | 12/2014 | Smith | ............... | H04W 36/0072 370/332 |
| 2015/0018002 A1* | 1/2015 | Touag | ............... | H04W 16/14 455/454 |
| 2015/0142961 A1* | 5/2015 | Ogawa | ............... | H04L 41/0816 709/224 |

* cited by examiner

*Primary Examiner* — Jean Gelin (57) ABSTRACT

A wireless telecommunications system may be configured to provide wireless service via unlicensed, licensed, and/or shared frequency bands (e.g., frequency bands that are shared with other telecommunications systems, and for which access is regulated by an external entity). A load balancing technique, described herein, may provide load balancing between licensed and shared frequency bands based on relative load of the licensed and shared networks, and/or other factors (e.g., a priority access license ("PAL") of a base station to which the user device is attached). Techniques described herein may be useful in carrier aggregation, in which a user device may simultaneously attach to multiple carriers (e.g., a licensed carrier, along with a shared carrier and/or an unlicensed carrier).

20 Claims, 7 Drawing Sheets

SHARED SPECTRUM LOAD BALANCING BASED ON NETWORK LOAD

BACKGROUND

User devices, such as wireless telephones may wirelessly connect, or "attach," to a wireless network via a base station. The base station may provide multiple carriers, to which the user devices may attach. As used herein, a particular "carrier" may refer to a particular radio access technology, a particular frequency band, and/or a particular set of frequencies within a frequency band. The frequency bands, provided by the base station, may include licensed frequency bands. "Licensed" frequency bands may be frequency bands which have been licensed, by an authoritative entity, such as a government agency, for exclusive use by a particular wireless network service provider. In some situations, the base station may also provide service according to one or more shared frequency bands. "Shared" frequency bands may be frequency bands that have been authorized (e.g., by an authoritative entity) for use by multiple wireless network service providers.

DETAILED DESCRIPTION OF PREFERRED EMBODIMENTS

The following detailed description refers to the accompanying drawings. The same reference numbers in different drawings may identify the same or similar elements.

Wireless network service providers may obtain licenses (e.g., exclusive or priority licenses) to operate wireless networks at certain frequency bands ("licensed" frequency bands). Wireless network service providers may also obtain licenses to operate wireless networks at shared frequency bands, which may be shared with other wireless network service providers. Access to a shared frequency band may be controlled by an owner or an incumbent associated with the shared frequency band, or an authoritative entity (such as a governmental agency). In some situations, a base station of a wireless network may perform load balancing (e.g., during carrier aggregation scenarios, and/or when receiving attach requests from user devices). Specifically, in accordance with some implementations described herein, network load of various bands (e.g., of shared spectrum bands, licensed spectrum bands, and/or unlicensed spectrum bands) may be determined or approximated. This network load information may be used to load balance user devices across available bands (e.g., carrier aggregation may be performed, across multiple bands, when respective bands are not overloaded).

Figure 1:
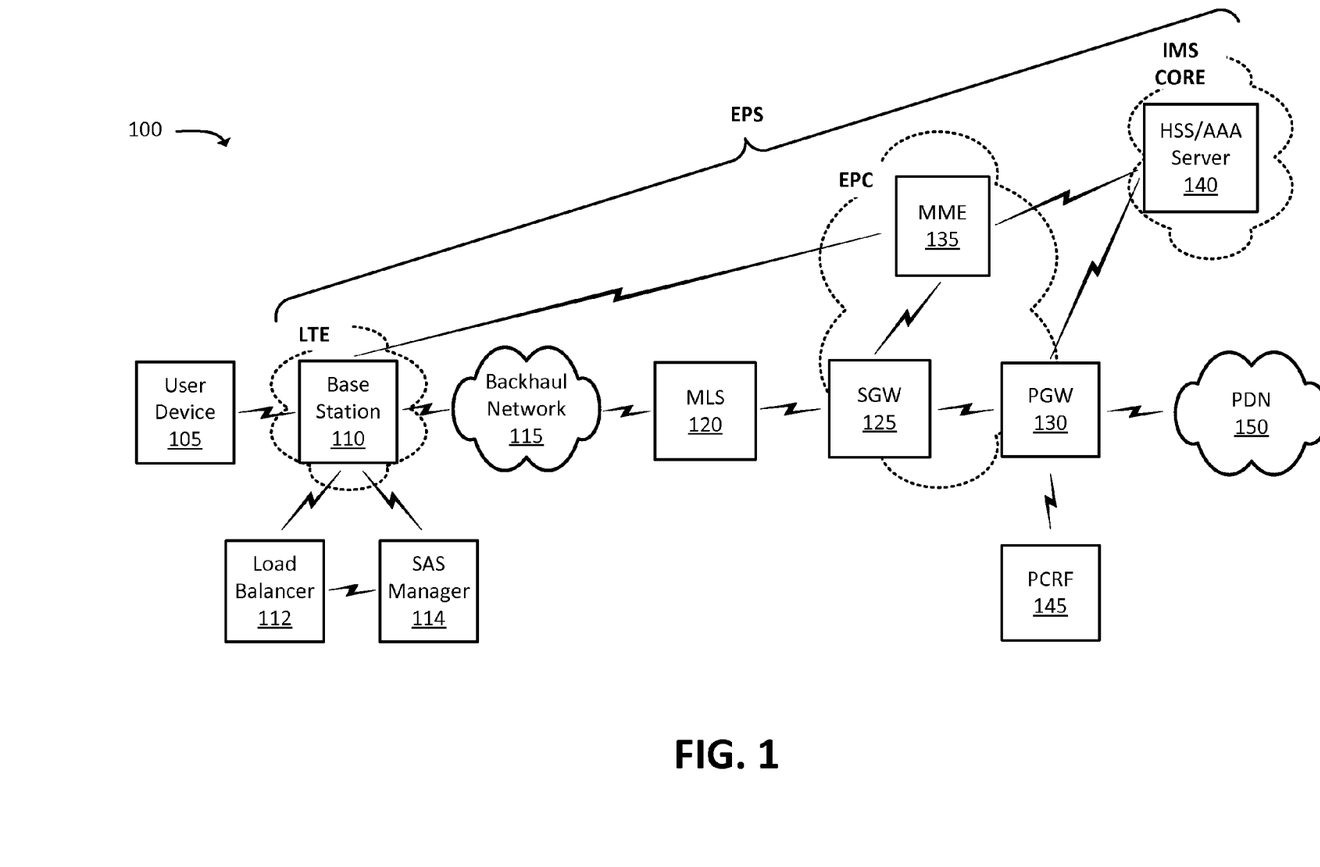
FIG. 1 illustrates an example environment, in which systems and/or methods, described herein, may be implemented.

FIG. 1 illustrates an example environment 100, in which systems and/or methods described herein may be implemented. As shown in FIG. 1, environment 100 may include user device 105, base station 110, load balancer 112, Spectrum Access System ("SAS") manager 114, backhaul network 115, multi-layer switch ("MLS") 120, serving gateway ("SGW") 125, packet data network ("PDN") gateway ("PGW") 130, mobility management entity device ("MME") 135, home subscriber server ("HSS")/authentication, authorization, accounting ("AAA") server 140 (hereinafter referred to as "HSS/AAA server 140"), policy and charging rules function ("PCRF") 145, and PDN 150.

Environment 100 may include an evolved packet system ("EPS") that includes a Long-Term Evolution ("LTE") network and/or an evolved packet core ("EPC") network that operate based on a third generation partnership project ("3GPP") wireless communication standard. The LTE network may be, or may include, a radio access network ("RAN") that includes one or more base stations 110, some or all of which may take the form of an evolved node B ("eNB"), via which user device 105 may communicate with the EPC network. The EPC network may include one or more SGWs 125, PGWs 130, and/or MMEs 135, and may enable user device 105 to communicate with PDN 150 and/or an Internet protocol ("IP") multimedia subsystem ("IMS") core network. The IMS core network may include HSS/AAA server 140, and may manage authentication, session initiation, account information, a user profile, etc., associated with user device 105.

User device 105 may include any computation and communication device, such as a wireless mobile communication device that is capable of communicating with base station 110 and/or PDN 150. For example, user device 105 may include a radiotelephone; a personal communications system ("PCS") terminal (e.g., a device that combines a cellular radiotelephone with data processing and data communications capabilities); a personal digital assistant ("PDA") (e.g., that can include a radiotelephone, a pager, Internet/intranet access, etc.); a smart phone; a laptop computer; a tablet computer; a camera; a wearable device; a personal gaming system; or another type of mobile computation and communication device. User device 105 may send traffic to and/or receive traffic from PDN 150 via base station 110, backhaul network 115, MLS 120, SGW 125, and/or PGW 130.

Base station 110 may include one or more network devices that receive, process, and/or transmit traffic, such as calls, audio, video, text, and/or other data, destined for and/or received from user device 105. In one example, base station 110 may be an eNB device and may be part of the LTE network. Additionally, or alternatively, one or more other base stations 110 may be associated with a RAN that is not associated with the LTE network (e.g., a wireless hot spot, a wireless access point, etc.). Base station 110 may receive traffic from and/or send traffic to user device 105 via SGW 125, PGW 130, and/or PDN 150. Base station 110 may send traffic to and/or receive traffic from user device 105 via, for example, an air interface (e.g., a cellular air interface).

Base station 110 may be associated with one or more cells. The term "cell," as used to herein, may generally refer to a coverage area provided by base station 110. A particular cell may, for example, be associated with one or more radios pointed in the same general direction. The different radios may each be associated with a particular frequency band, and/or more than one radio may be associated with a particular frequency band. For example, one or more radios may be associated with a licensed frequency band, while one or more other radios of the cell may be associated with a shared frequency band. Base station 110 may include processing logic and/or hardware circuitry that may enable base station 110 to perform inter-frequency handovers and/or carrier aggregation. For example, base station 110 may hand over a particular user device 105 from one frequency band to another frequency band (e.g., from a licensed frequency band to another licensed frequency band, from a shared frequency band to another shared frequency band, from a shared frequency band to a licensed frequency band, or from a licensed frequency band to a shared frequency band). Base station 110 may also perform intra-frequency handovers (e.g., hand over a particular user device 105 from one sub-band to another sub-band of a particular frequency band), and/or may perform inter-radio access technology ("RAT") handovers (e.g., may hand over a particular user device 105 from one RAT to another RAT). Additionally, or alternatively, base station 110 may perform carrier aggregation, in which multiple carriers may be used for a particular user device 105, in order to improve performance (e.g., throughput, latency, and/or reliability) experienced by the particular user device 105.

Load balancer 112 may include one or more devices that perform load balancing of user devices 105, with respect to various carriers (where a "carrier" may refer to a particular frequency band, a particular frequency sub-band, and/or a particular RAT) associated with base station 110. For example, load balancer 112 may determine measures of load associated with particular carriers, associated with base station 110, and may make handover decisions based on the measures of load. For example, if a first carrier is relatively overloaded, while a second carrier is relatively underutilized, load balancer 112 may output an instruction to base station 110 to hand over one or more user devices 105, connected to the first carrier, to the second carrier. As described herein, the load balancing decisions, made by load balancer 112, may be based on one or more other factors. For instance, load balancer 112 may make load balancing decisions based on access permissions, to shared frequency bands, provided by SAS manager 114. Additionally, or alternatively, load balancer 112 may make load balancing decisions based on factors such as a device type of user device 105 and/or a traffic type associated with user device 105.

Figure 3:
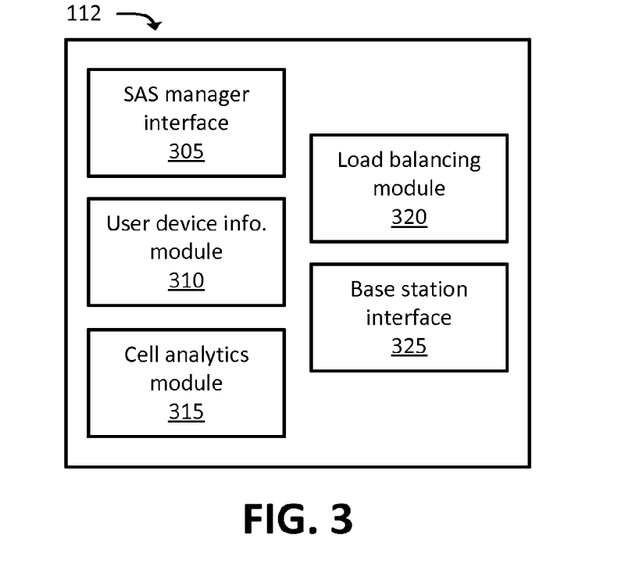
FIG. 3 illustrates example functional components of a shared/licensed load balancer, in accordance with one or more implementations.

While one base station 110 and one load balancer 112 are shown in FIG. 3 (e.g., a one-to-one arrangement), other arrangements are possible in practice. For example, in some implementations, one load balancer 112 may perform load balancing for multiple base stations 110. In some implementations, some portions of Load balancer 112 (e.g., as discussed below with respect to FIG. 4) may perform some functionality associated with multiple base stations 110, while other portions of load balancer 112 may be arranged on a one-to-one basis with base stations 110. In some implementations, load balancer 112 may be implemented as part of base station 110 (e.g., may be implemented as software logic within base station 110 and/or as integrated hardware circuitry within base station 110).

SAS manager 114 may include one or more devices that provide information, such as access permissions, load information, or the like, to base station 110 and/or load balancer 112. The access permissions may indicate, for example, a level of access permitted to a particular shared frequency band. For example, access permissions may indicate a maximum transmit strength associated with a particular shared frequency band, may specify a permissible coverage area or radius associated with a particular shared frequency band, and/or may indicate a maximum measure of permissible load (e.g., a maximum quantity of permitted user devices 105, a maximum amount of permitted throughput, etc.) associated with a particular shared frequency band. SAS manager 114 may be owned by, operated by, managed by, and/or receive information from an entity that owns a license to operate and/or control access to a shared frequency band, such as an incumbent and/or a governmental agency. As referred to herein, an "incumbent" may be an entity that has top-tier (e.g., a highest priority) access to the shared frequency band. SAS manager 114 may, in some implementations, communicate with base station 110 and/or load balancer 112 via one or more networks and devices (e.g., via PDN 150 and/or an Operations System Support ("OSS") device (not pictured)).

Backhaul network 115 may include one or more network devices (e.g., routers and/or switches) and links (e.g., fiber or coaxial links), that connect base station 110 to a core network (e.g., a core network that includes and/or is associated with MLS 120, SGW 125, and/or PGW 130).

MLS 120 may include one or more network devices that perform switching functionality on traffic received from SGW 125 and/or backhaul network 115. MLS 120 may operate multiple layers of the Open Systems Interconnection ("OSI") reference model, in contrast with other types of switches that traditionally operate only on the Data Link Layer ("DLL"). For example, MLS 120 may perform deep packet inspection to perform routing functions.

SGW 125 may include one or more network devices that gather, process, search, store, and/or provide information in a manner described herein. SGW 125 may, for example, aggregate traffic received from one or more base stations 110 and may send the aggregated traffic to PDN 150 via PGW 130.

PGW 130 may include one or more network devices that gather, process, search, store, and/or provide information in a manner described herein. PGW 130 may aggregate traffic received from one or more SGWs 125, etc. and may send the aggregated traffic to PDN 150. PGW 130 may also, or alternatively, receive traffic from PDN 150 and may send the traffic toward user device 105 via base station 110, and SGW 125.

MME 135 may include one or more computation and communication devices that perform operations to register user device 105 with the EPS, to establish bearer channels associated with a session with user device 105, to hand off user device 105 from the EPS to another network, to hand off user device 105 from the other network to the EPS, and/or to perform other operations. MME 135 may perform policing operations on traffic destined for and/or received from user device 105.

HSS/AAA server 140 may include one or more devices that manage, update, and/or store, in a memory associated with HSS/AAA server 140, profile information associated with a subscriber. The profile information may identify applications and/or services that are permitted for and/or accessible by the subscriber; a mobile directory number ("MDN") associated with the subscriber; bandwidth or data rate thresholds associated with the applications and/or services; information associated with the subscriber (e.g., a username, a password, etc.); rate information; minutes allowed for a subscriber (e.g., a subscriber associated with user device 105); information regarding services to which particular subscribers are subscribed (e.g., communication services, such as video conferencing services, voice chat services, etc.); and/or other information. Additionally, or alternatively, HSS/AAA server 140 may perform authentication, authorization, and/or accounting operations associated with the subscriber and/or a communication session with user device 105.

PCRF 145 may include one or more devices that aggregate information to and from the EPC network and/or other sources. PCRF 145 may receive information regarding policies and/or subscriptions from one or more sources, such as subscriber databases and/or from one or more users (such as, for example, an administrator associated with PCRF 145).

PDN 150 may include one or more wired and/or wireless networks. For example, PDN 150 may include an Internet Protocol ("IP")-based PDN, a wide area network ("WAN") such as the Internet, a core network of a telecommunications provider, a private enterprise network, and/or one or more other networks. User device 105 may connect, through PGW 130, to data servers, application servers, other user devices 105, content provider 275, and/or to other servers or applications that are coupled to PDN 150. PDN 150 may be connected to one or more other networks, such as a public switched telephone network ("PSTN"), a public land mobile network ("PLMN"), and/or another network. While "direct" connections are shown in FIG. 3 between certain devices, some devices may communicate with each other via PDN 150. For example, SAS manager 114 may communicate with base station 110 and/or load balancer 112 indirectly, such as via PDN 150 and/or another network.

Figure 2:
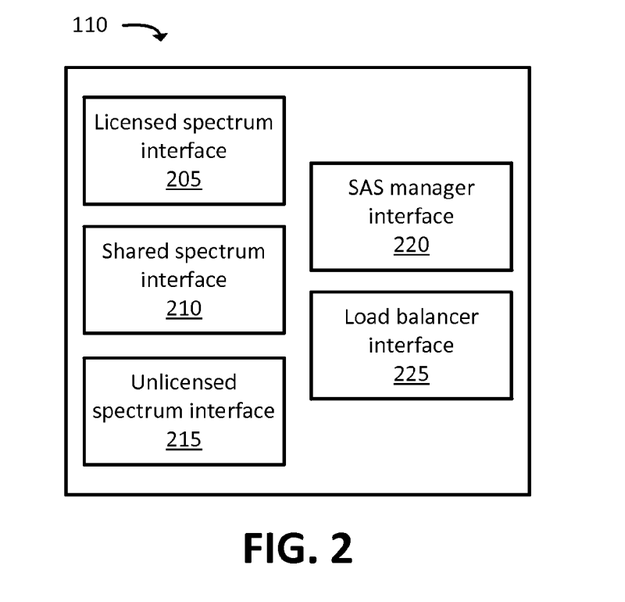
FIG. 2 illustrates example functional components of a base station, in accordance with one or more implementations.

FIG. 2 illustrates example functional components of base station 110. As shown, base station 110 may include licensed spectrum interface 205, shared spectrum interface 210, unlicensed spectrum interface 215, SAS manager interface 220, and load balancer interface 225. In other implementations, base station 110 may include additional, fewer, different, and/or differently arranged components. Further, the functionality of one component may be performed by one or more other components. Also, the functionality of multiple components may be performed by one component.

Interfaces 205-215 may generally include hardware circuitry and/or software logic that allow base station 110 to communicate wirelessly with one or more other devices, such as user device 105. Interfaces 205-215 may each operate at different respective RATs and/or frequency bands. For example, licensed spectrum interface 205 may utilize one or more RATs, and/or operate at one or more frequency bands, that are associated with a licensed spectrum. For instance, licensed spectrum interface 205 may operate according to an LTE RAT, a 3GPP Third Generation ("3G") RAT, and/or another RAT that corresponds to a licensed spectrum.

Shared spectrum interface 210 may utilize one or more RATs, and/or operate at one or more frequency bands, that are associated with a shared spectrum. For instance, shared spectrum interface 210 may operate according to an LTE RAT, at a different frequency band than licensed LTE frequency bands. For example, in some implementations, the licensed LTE frequency bands may include a 700 Megahertz ("MHz") band, while the shared LTE frequency bands may include a 3.5 Gigahertz ("GHz") band.

Unlicensed spectrum interface 215 may utilize one or more RATs, and/or operate at one or more frequency bands, that are associated with an unlicensed spectrum. For instance, unlicensed spectrum interface 215 may operate according to an LTE-Unlicensed ("LTE-U") RAT, an LTE-Licensed Assisted Access ("LTE-LAA") RAT, a Wi-Fi RAT (e.g., a RAT based on an Institute of Electrical and Electronics Engineers ("IEEE") 802.11-based standard), or the like. In some implementations, unlicensed spectrum interface 215 may operate at a 5 GHz band, a 2.4 GHz band, or another unlicensed frequency band.

Base station 110 may receive, via unlicensed spectrum interface 215, information relating to user devices 105 that are within communication range of base station 110 (e.g., communication range via an unlicensed RAT). The information may include, for instance, signal strength information, such as a Received Signal Strength Indication ("RSSI"), a Signal to Interference and Noise Ratio ("SINR"), and/or another indicator of signal strength. The signal strength information may be, for example, received from one or more user devices 105, and/or may be determined by unlicensed spectrum interface 215 (or another component of base station 110) based on communications with one or more user devices 105 in communication range of base station 110.

SAS manager interface 220 may include an interface, which may be an implementation of a particular application programming interface ("API"), via which base station 110 may receive communications from SAS manager 114. The API may, in some implementations, be defined by an owner and/or operator of SAS manager 114. Additionally, or alternatively, messaging and/or security protocols, via which base station 110 and SAS manager 114 communicate, may be defined by an owner and/or operator of SAS manager 114. The communications may include, for example, access permissions associated with one or more shared frequency bands associated base station 110.

Load balancer interface 225 may include an interface, which may be an implementation of a particular API, via which base station 110 may send and/or receive communications to and/or from load balancer 112. The communications, from load balancer 112, may include load balancing instructions and/or load balancing-related information. The load-balancing instructions and/or information may be used by base station 110 when performing carrier aggregation, initial attachment procedures, and/or intra-RAT handovers. Base station 110 may also provide, via load balancer interface 225, information that may assist load balancer 112 in performing load balancing operations. For instance, base station 110 may provide signal strength information, received via unlicensed spectrum interface 215, which load balancer 112 may use when performing load balancing operations, as described in further detail below. While shown in separate diagrams for the sake of explanation, base station 110 (shown in FIG. 2) and load balancer 112 (shown in FIG. 3) may, in some implementations, be integrated as a single device. Thus, in some such implementations, load balancer interface 225 may be implemented as an intra-device physical bus and/or logical communication pathway.

FIG. 3 illustrates example functional components of load balancer 112, in accordance with some implementations. As shown, load balancer 112 may include SAS manager interface 305, user device information module 310, cell analytics module 315, load balancing module 320, load balancing module 320, and base station interface 325. In other implementations, load balancer 112 may include additional, fewer, different, and/or differently arranged modules. Further, the functionality of one module may be performed by one or more other modules. Also, the functionality of multiple modules may be performed by one module.

SAS manager interface 305 may include an interface, which may be an implementation of a particular API, via which load balancer 112 may receive communications from SAS manager 114. The API may, in some implementations, be defined by an owner and/or operator of SAS manager 114. Additionally, or alternatively, messaging and/or security protocols, via which load balancer 112 and SAS manager 114 communicate, may be defined by an owner and/or operator of SAS manager 114. The communications may include, for example, access permissions associated with one or more shared frequency bands associated with one or more base stations 110. In some implementations, load balancer 112 may receive, via SAS manager interface 305, signal strength information (e.g., RSSI, SINR, etc.) associated with user devices 105 in range of, or connected to, base station 110 via a shared spectrum RAT. As yet another example, load balancer 112 may receive, via SAS manager interface 305, information indicating a load of a particular shared spectrum RAT, at base station 110 (e.g., a quantity of user devices 105 connected via the shared spectrum RAT, an amount of available bandwidth via the shared spectrum RAT, a round trip latency of traffic via the shared spectrum RAT, etc.).

User device information module 310 may receive and/or store information regarding user devices 105, connected to base station 110. For example, user device information module 310 may receive the information from base station 110 and/or another device that obtains and/or stores user device information. In some implementations, user device information module 310 may request user device information directly from user devices 105. The user device information may include, for example, information indicating a device type (e.g., whether the device is a mobile telephone, a tablet device, a mobile-to-mobile ("M2M") device, a desktop computer, etc.) and/or a type of traffic presently being sent and/or received by the device (e.g., voice call traffic, video call traffic, file transfer traffic, web browsing traffic, instant messaging traffic, etc.). User device information module 310 may additionally, or alternatively, receive other information, such as RSSI values associated with user devices 105. For example, a particular RSSI value may indicate a received signal strength, for a particular user device 105, of a signal via a particular carrier (e.g., via a carrier of an unlicensed frequency band).

Cell analytics module 315 may receive and/or store analytics information regarding one or more cells associated with base station 110. For example, the cell analytics information may indicate how loaded the cells are, and may be on a per-carrier basis. For a particular cell, the cell analytics information may indicate how loaded each carrier, associated with the particular cell, is. For instance, a particular carrier may be considered as being highly "loaded" when a relatively large quantity of user devices 105 are connected to base station 110 via the carrier. As another example, a measure of load may indicate how many resource blocks, associated with a particular carrier have been utilized, and/or how many resource blocks are available. Cell analytics module 315 may receive analytics information regarding one cell (e.g., carriers associated with one cell) or more than one cell (e.g., carriers associated with two or more cells). Cell analytics module 315 may receive the analytics information from base station 110 and/or from another device (e.g., a device that communicates with one or more base stations 110 in order to determine the analytics information). The cell analytics information may be real time, or near-real time information. For example, cell analytics module 315 may receive up-to-date analytics information, as the information is collected or generated.

Load balancing module 320 may perform load balancing operations based on shared access permissions (e.g., received from SAS manager interface 305), user device information (e.g., received from user device information module 310, which may include signal strength information and/or other types of information), and/or analytics information (e.g., received from cell analytics module 315). For example, load balancing module 320 may receive access permission information, for a particular shared frequency band, indicating a maximum level of load for the particular shared frequency band. Load balancing module 320 may determine, based on cell analytics information, whether the particular shared frequency band is overloaded. If the particular shared frequency band is overloaded, load balancing module 320 may determine which user device(s) 105 to hand over to a different frequency band, and may further determine to which frequency band(s) user device(s) 105 should be handed over. Load balancing module 320 may, in some implementations, use information regarding the unlicensed spectrum (e.g., signal strength information) when determining a load of the unlicensed spectrum, and may select the unlicensed spectrum or the shared spectrum, for a particular user device 105, based on the relative loads of the unlicensed and the shared spectrums.

Figure 4:
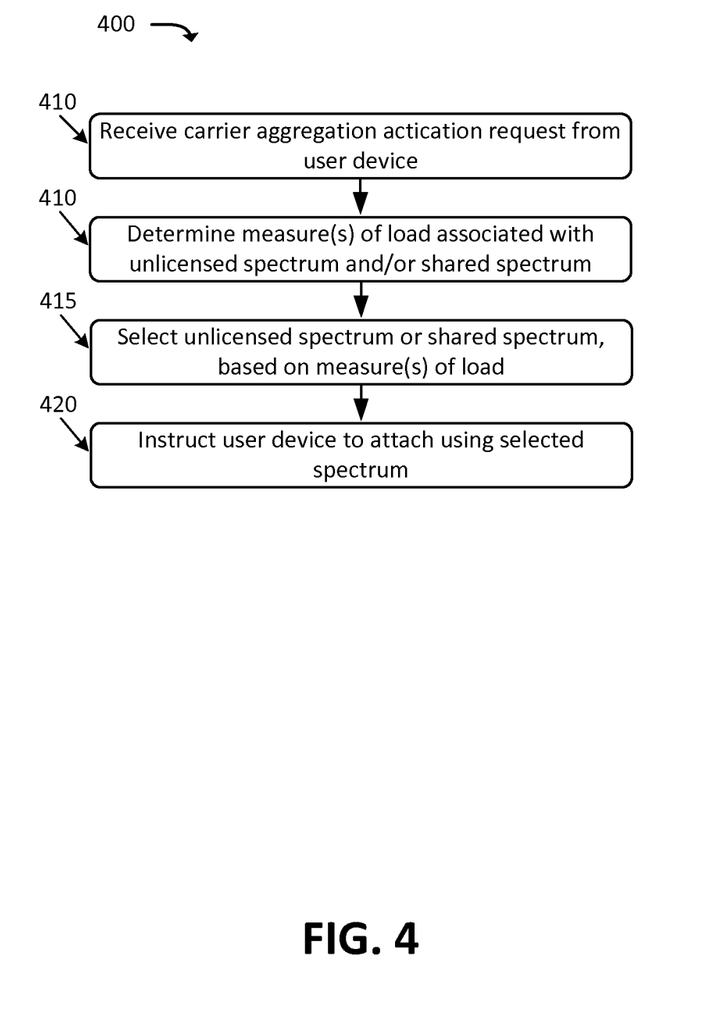
FIG. 4 illustrates a flowchart of an example process for performing load balancing among licensed, unlicensed, and shared frequency bands, based on network load.
Figure 7:
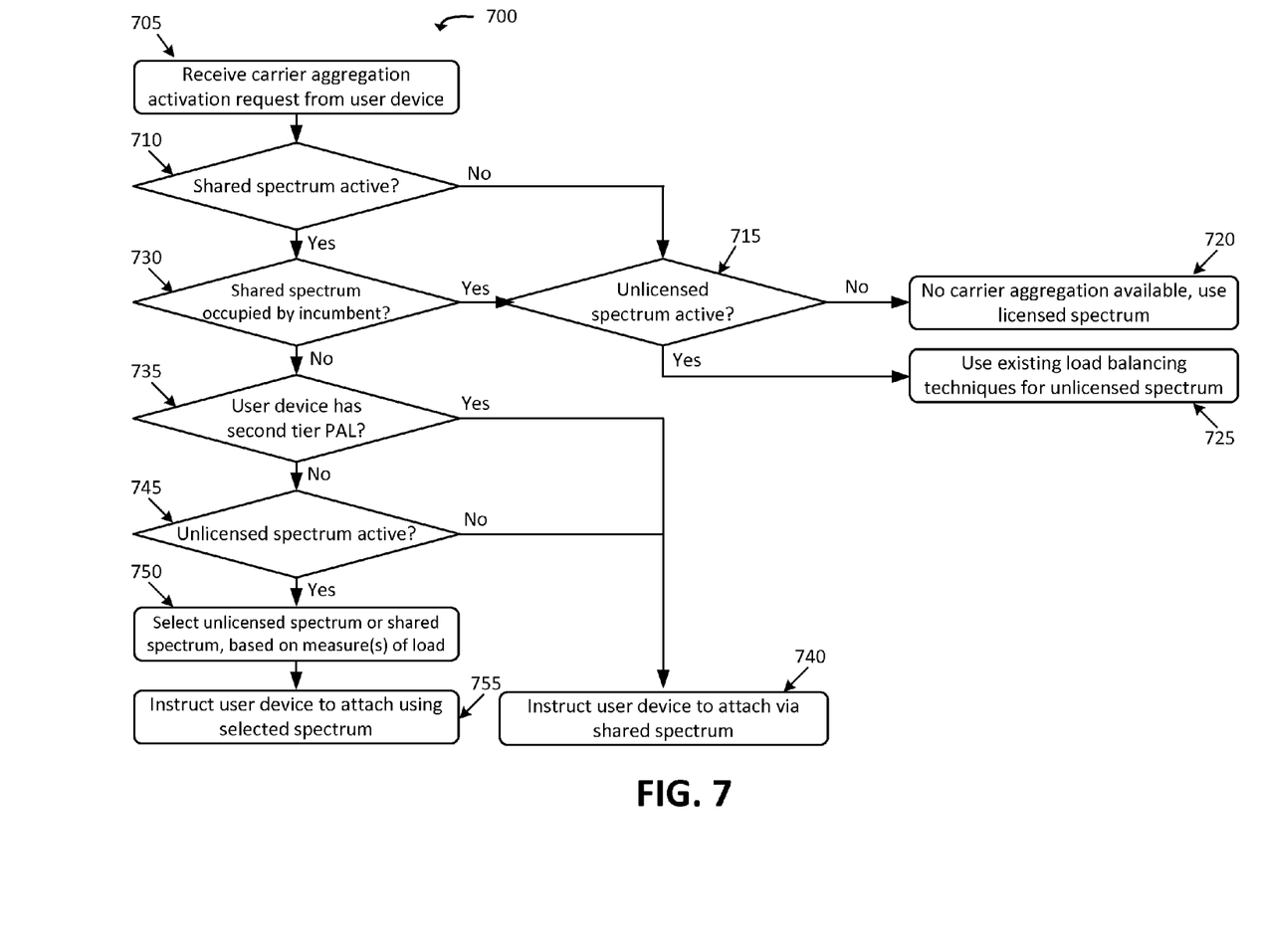
FIG. 7 illustrates another flowchart of an example process for performing load balancing among licensed, unlicensed, and shared frequency bands, based on network load.

FIGS. 4 and 7, described below, illustrate example implementations of how load balancing module 320 may perform load balancing. In some implementations, and/or in some situations, load balancing module 320 may additionally perform "conventional" load balancing, in which load balancing decisions may be made without regard to whether a particular carrier is associated with a shared frequency band or a licensed frequency band. Additionally, or alternatively, load balancing module 320 may be used in conjunction with a "conventional" (or other) load balancer.

Base station interface 325 may include an interface, such as an implementation of an API and/or another type of interface, via which load balancer 112 may communicate with one or more base stations 110. For example, Load balancer 112 may receive information regarding user devices 105 (e.g., RSSI information, traffic type information, device type information) and/or carriers associated with base station 110 (e.g., cell analytics information) via base station interface 325. Load balancer 112 may output instructions, such as handover instructions, carrier aggregation instructions, or the like, to base station 110 via base station interface 325.

FIG. 4 illustrates an example process 400, in which load balancing may be performed by load balancer 112 (e.g., by one or more of modules 305-325, described above with respect to FIG. 3). In some implementations, process 400 may be performed by, or in conjunction with, one or more other devices in addition to, or in lieu of, load balancer 112. Process 400 generally describes the selection between directing a user device to use unlicensed spectrum as opposed to shared spectrum (or vice versa) based on respective measures of load associated with RATs of both spectrums, while process 700 (described below with respect to FIG. 7) describes a more detailed implementation of load balancing between spectrums.

As shown, process 400 may include receiving (at 405) a carrier aggregation activation request from a user device. For example, base station 110 may receive a carrier aggregation activation request from user device 105. Load balancer 112 may be notified of the request, via base station interface 325. In some implementations, the request (received at 405) may be an attachment request (e.g., from user device 105), and/or may be based on a handover instruction from MME 135.

Process 400 may also include determining (at 410) one or more measures of load associated with an unlicensed spectrum RAT and/or a shared spectrum RAT. For example, as described above with respect to licensed spectrum interface 205 and/or cell analytics module 315, load balancer 112 may determine one or more measures of load associated with a network that corresponds to an unlicensed spectrum RAT (e.g., an LTE-U network associated with base station 110, an LTE-LAA network associated with base station 110, or the like), and/or with a network that corresponds to a shared spectrum RAT (e.g., a shared 3.5 GHz frequency band of an LTE network associated with base station 110).

For instance, the measure(s) of load, for a particular network that corresponds to a particular RAT, may include a quantity of user devices 105 attached via the particular network, an amount of available bandwidth (e.g., uplink and/or downlink) associated with the particular network, a round trip delay (e.g., latency) of packets associated with the network, and/or other measures of load. The measure(s) of load may be received from, for example, base station 110, SAS manager 114, and/or one or more other devices.

In some implementations, the quantity of user devices 105, attached via the network that corresponds to the unlicensed spectrum RAT, may be determined based on a quantity of signal strength measurements (e.g., RSSI values, SINR values, etc.) received via the unlicensed spectrum RAT network. For example, user devices 105 may make such measurements, and may report the measurements to base station 110 (or another device). Load balancer 112 may use a quantity of these measurements, at a given time or during a given time window, to determine a quantity of user devices 110 connected via the unlicensed spectrum RAT network at the given time or during the given time window. Generally, the more user devices that are attached to the unlicensed spectrum RAT network, the more signal strength measurements would be expected to be received.

Process 400 may additionally include selecting (at 415) the unlicensed spectrum or the shared spectrum, based on the one or more measures of load. For example, as described above with respect to load balancing module 320, load balancer 112 may compare the measure(s) of load associated with the respective networks, in order to determine which network is loaded. In some implementations, and as described further below (e.g., with respect to FIGS. 5 and 6), other techniques may be used to select a particular network.

Process 400 may further include instructing (at 420) the user device to attach to a particular network that corresponds to the selected spectrum. For example, load balancer 112 may notify base station 110 of the selection, and base station 110 may instruct user device 105 to attach to the particular network. In some implementations, as mentioned above, the instruction to attach to the particular network may be in accordance with a carrier aggregation technique, in which user device 105 attaches to the selected network in addition to another network (e.g., a network that corresponds to a licensed spectrum RAT).

Figure 5:
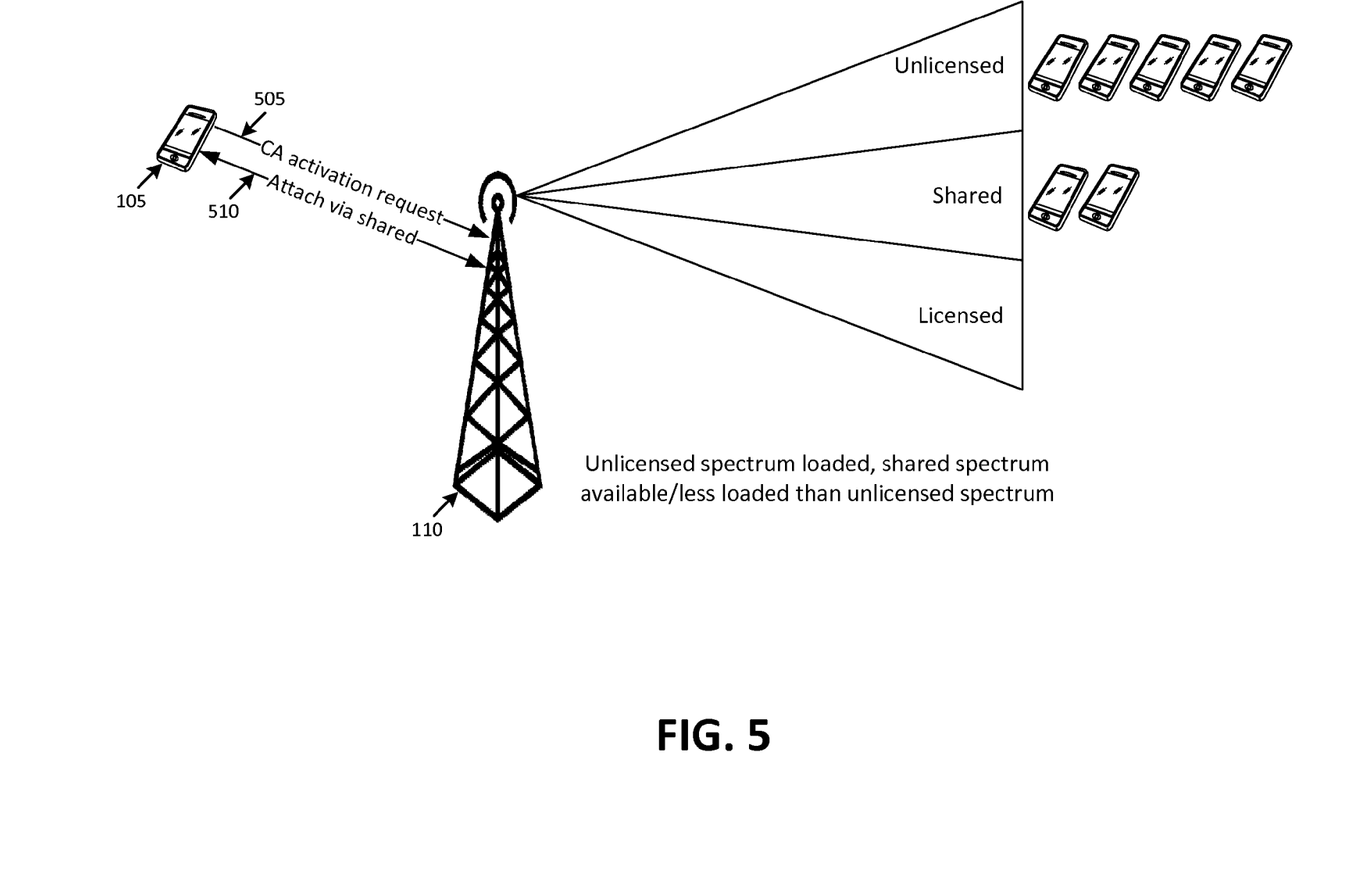
FIGS. 5 and 6 conceptually illustrate load balancing among licensed, unlicensed, and shared frequency bands, based on network load.
Figure 6:
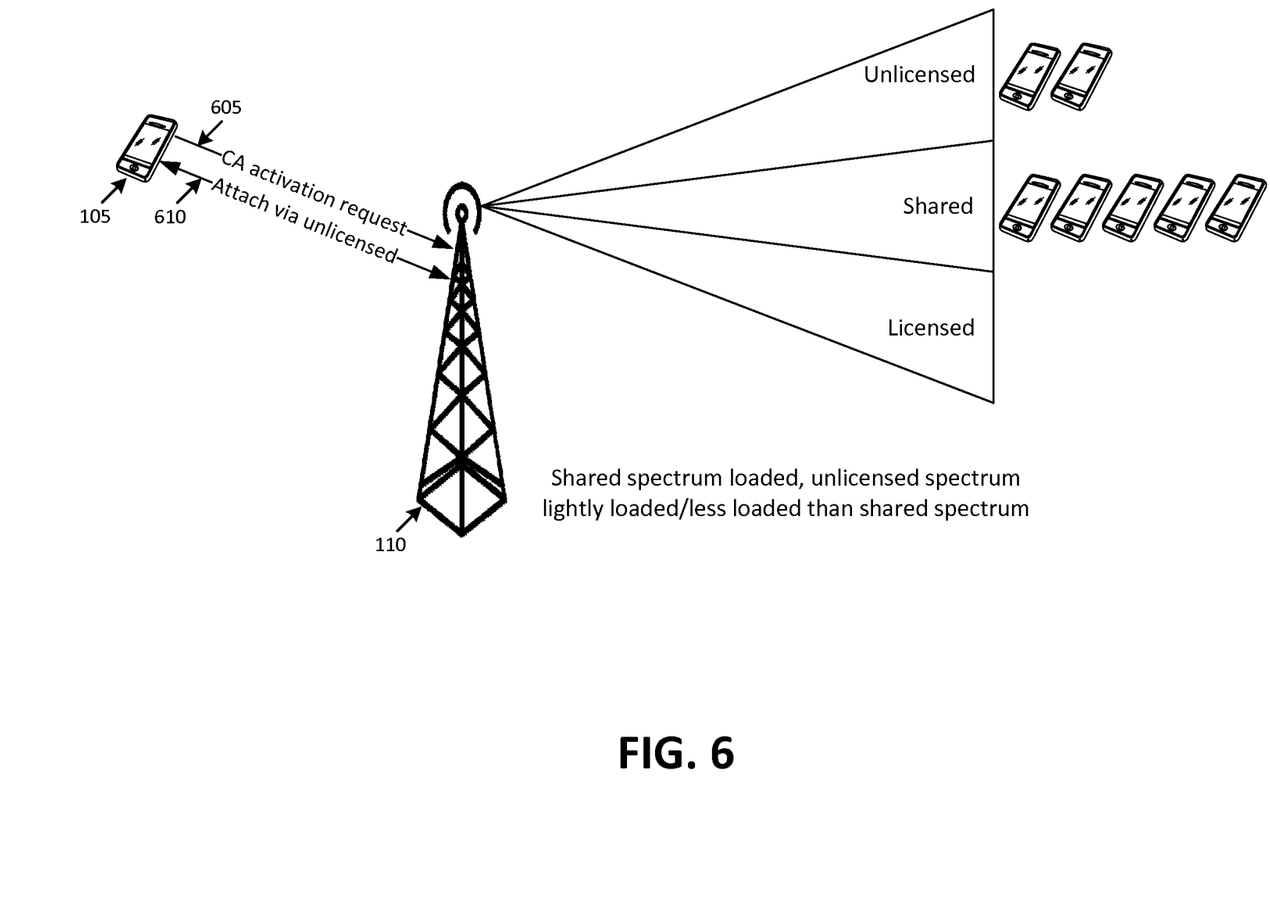

FIGS. 5 and 6 conceptually illustrate scenarios in which process 400 may be performed, in accordance with some implementations. For example, as shown in FIG. 5, base station 110 may be associated with three different RATs—an unlicensed spectrum RAT, a shared spectrum RAT, and a licensed spectrum RAT. As further shown, user device 105 may output (at 505) a carrier aggregation ("CA") activation request to base station 110. Based on this request, the respective loads of the unlicensed and the shared spectrum RAT networks may be determined (e.g., by load balancer 112). In this example, assume that the unlicensed spectrum RAT network is more heavily loaded than the shared spectrum RAT network (as denoted, in the figure, by the higher quantity of user devices shown as connected to the unlicensed spectrum RAT network).

Based on the determination that the unlicensed spectrum RAT network is more heavily loaded than the shared spectrum RAT network, base station 110 may be instructed (at 510) to attach to the shared spectrum RAT network. As mentioned above, the selection of the unlicensed spectrum RAT network may be made in another manner. For example, the shared spectrum RAT network may be selected when the load associated with the unlicensed spectrum RAT network is above a particular threshold, and/or when the load associated with the shared spectrum RAT network is below a particular threshold. For example, the shared spectrum RAT network may be selected due to (1) the unlicensed spectrum RAT network being more loaded than the shared spectrum RAT network, (2) the shared spectrum RAT network being less loaded than a particular threshold, and/or (3) the unlicensed spectrum RAT network being more loaded than a particular threshold.

One or more other factors may be used in the decision, such as a type of Priority Access License ("PAL") associated with base station 110, to which user device 105 is attached, with respect to the shared spectrum RAT network. For example, the shared spectrum RAT network may be associated with a variety of different tiers of priority, and base stations 110 may be associated with a PAL that indicates a particular tier for that base station 110 (and thus, to user devices 105 attached to base station 110). In some such implementations, the selection of the shared spectrum RAT network may be further based on the tier of the PAL associated with base station 110. For instance, if base station 110 is associated with a relatively high tier PAL, the selection of the shared spectrum RAT, for user devices 105 attached to base station 110, may be favored, whereas in instances where base station 110 is associated with a relatively lower tier PAL, the selection of the unlicensed spectrum RAT may be favored.

Referring to FIG. 6, assume that the shared spectrum RAT network is more loaded than the unlicensed spectrum RAT network. When user device 105 sends (at 605) a carrier aggregation activation request, in this example, the unlicensed spectrum RAT network may be selected, and user device 105 may be instructed (at 610) to attach via the unlicensed spectrum RAT network. As with the example in FIG. 5, the selection may be based on a variety of factors, such as which network is more loaded, whether one or both of the networks are above or below respective thresholds of load, a PAL associated with user device 105 (e.g., with base station 110, to which user device 105 is attached), and/or one or more other factors.

FIG. 7 illustrates an example process 700, in which load balancing may be performed by load balancer 112 (e.g., by one or more of modules 305-325, described above with respect to FIG. 3). In some implementations, process 700 may be performed by, or in conjunction with, one or more other devices in addition to, or in lieu of, load balancer 112. As mentioned above, process 700 may be a more detailed process, in accordance with some implementations, that describes the selection between directing a user device to use unlicensed spectrum as opposed to shared spectrum (or vice versa) based on respective measures of load associated with RATs of both spectrums.

As shown, process 700 may include receiving (at 705) a carrier aggregation activation request from a user device. As similarly described above with respect to block 405, the carrier aggregation activation request may be received, by base station 110, from user device 105. In some implementations, base station 110 may receive an initial attachment request, and/or a handover instruction from MME 135.

Process 700 may also include determining (at 710) whether a network, according to a shared spectrum RAT, is active. For example, load balancer 112 may receive, via base station interface 325, information indicating whether base station 110 is associated with an active network that operates at a shared spectrum RAT. In some implementations, base station 110 may not be associated with a shared spectrum RAT network, and/or the network may be down (or otherwise unavailable for use).

If a network, according to a shared spectrum RAT, is not active (at 710—NO), then process 700 may include determining (at 715) whether a network, according to an unlicensed spectrum RAT, is active. For example, load balancer 112 may receive, via base station interface 325, information indicating whether base station 110 is associated with an active network that operates at an unlicensed spectrum RAT.

If a network, according to an unlicensed spectrum RAT, is not active (at 715—NO), then carrier aggregation may not be available, and conventional load balancing techniques for the licensed spectrum may be used (at 720). For example, load balancer 112 may perform (or continue to perform) conventional and/or other types of load balancing on user device 110 and/or other user devices that are attached to the licensed spectrum RAT network. In other words, since carrier aggregation would not be available in this situation, the carrier aggregation activation request, made by base station 110, may be denied.

If, on the other hand, a network, according to an unlicensed spectrum RAT, is active (715—YES), then carrier aggregation may be available, and conventional load balancing techniques (e.g., conventional LTE-U, LTE-LAA, etc., load balancing algorithms) may be used (at 725). For example, load balancer 112 may determine that base station 110 should attach to the unlicensed spectrum RAT network, and load balancer 112 may perform conventional and/or other types of load balancing on user device 110 and/or other user devices that are attached to the unlicensed spectrum RAT network. In this scenario, base station 110 may output a message to user device 105, indicating that the carrier aggregation activation request has been granted, and user device 105 should attach to the unlicensed spectrum RAT network.

Returning to block 710, if a network, according to a shared spectrum RAT, is active (at 710—YES), then process 700 may include determining (at 730) whether a network, according to a shared spectrum RAT, is occupied by an incumbent. For instance, assuming that user device 105 is not itself an incumbent (e.g., is not attached to a base station 110 that has a highest tier PAL), load balancer 112 may determine whether the shared spectrum RAT network is occupied by an incumbent, and/or is otherwise unavailable for use. For instance, load balancer 112 may receive information from base station 110 and/or from SAS manager 114 indicating whether the network is occupied by an incumbent and/or is otherwise unavailable for use by user device 105.

If the shared spectrum RAT network is occupied by an incumbent, and/or is otherwise unavailable for use (at 730—YES), then process 700 may transition to block 715. If, on the other hand, the shared spectrum RAT network is not occupied by an incumbent (at 730—NO), then process 700 may include determining (at 735) whether the user device has a second tier PAL (e.g., whether base station 110, to which user device 105 is attached, has a second tier PAL). A second tier PAL may have a priority that is below an incumbent (which may be considered a first tier PAL). Load balancer 112 may determine the PAL of user device 105 by querying SAS manager 114 for information regarding the PAL of base station 110, to which user device 105 is attached. In some implementations, SAS manager 114 may provide an indication to load balancer 112, indicating that the shared spectrum RAT is available for use by user device 105.

If the user device has a second tier PAL (at 735—YES), then the user device may be instructed (at 740) to attach via the shared spectrum RAT. For example, load balancer 112 may notify base station 110 that user device 105 should attach to the shared spectrum RAT. In this scenario, base station 110 may output a message to user device 105, indicating that the carrier aggregation activation request has been granted, and user device 105 should attach to the unlicensed spectrum RAT network.

If, on the other hand, the user device does not have a second tier PAL (at 735—NO), then process 700 may include determining (at 745) whether an unlicensed spectrum RAT network is active. If user device 105 does not have a second tier PAL, then user device 105 may be assumed to have a third tier PAL (e.g., base station 110, to which user device 105 is attached, may have a third tier PAL). In some implementations, the third tier PAL may be the lowest tier PAL. Load balancer 112 may receive an indication, from base station 110, indicating whether base station 110 is associated with an active and/or available unlicensed spectrum RAT network (e.g., an LTE-U network, an LTE-LAA network, a WiFi network, etc.).

If an unlicensed spectrum RAT is not active (at 745—NO), then process 700 may transition to block 740 (i.e., instruct user device 105 to attach via the shared spectrum RAT network). While attached to the shared spectrum RAT network, user device 105 may be subsequently "kicked off" off the network, if the spectrum is needed for another device with a higher tier PAL (e.g., a device with a second tier PAL and/or an incumbent).

If, on the other hand, an unlicensed spectrum RAT is active (at 745—YES), then process 700 may include selecting between (at 750) the unlicensed spectrum RAT or the shared spectrum RAT, based on respective measures of load (e.g., in a manner similar to that described above with respect to block 415). Process 700 may further include instructing (at 755) the user device to attach to a network according to the selected spectrum.

Figure 8:
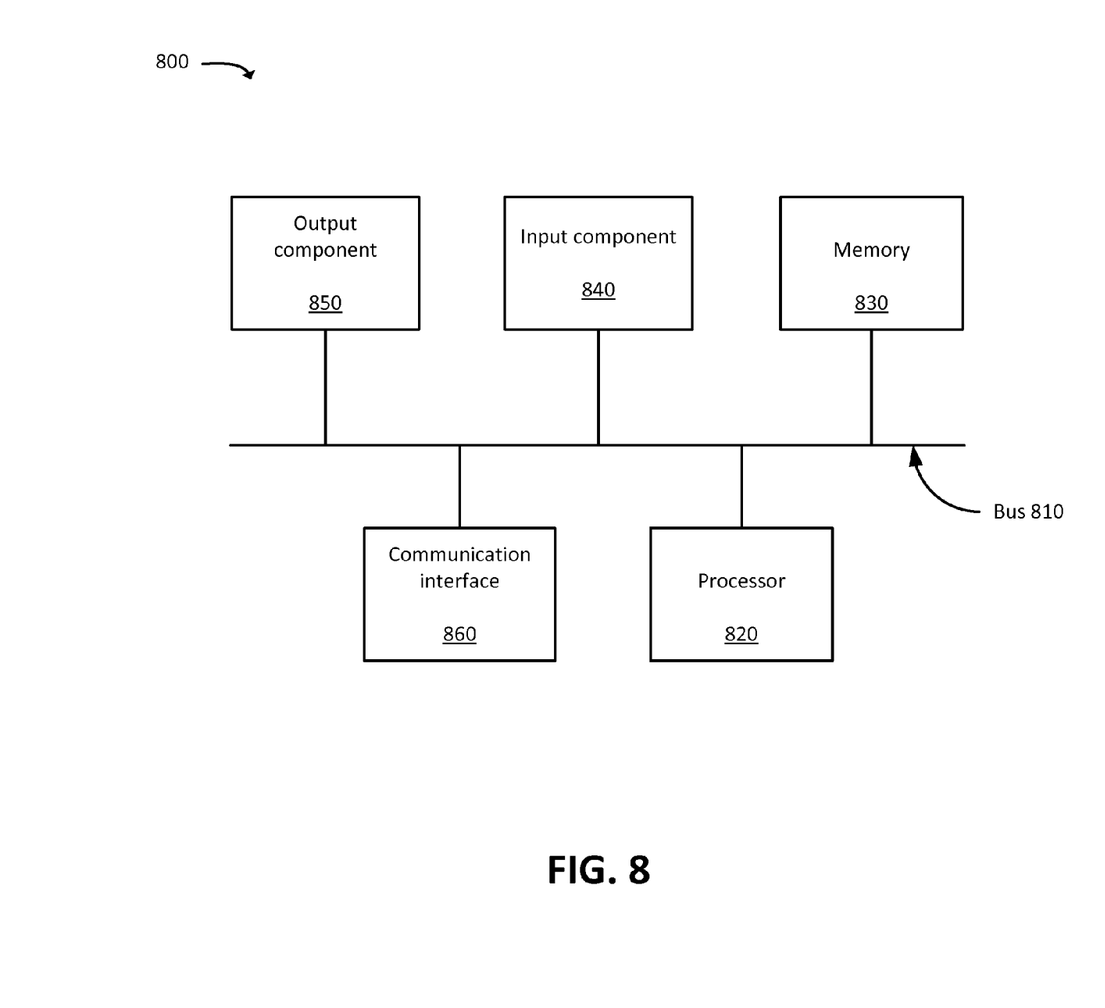
FIG. 8 illustrates example components of a device, in accordance with some implementations described herein.

FIG. 8 is a diagram of example components of device 800. One or more of the devices described above may include one or more devices 800. Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes ("LEDs"), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks have been described with regard to FIGS. 4 and 7, the order of the blocks and/or signals may be modified in other implementations. Further, non-dependent blocks and/or signals may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A system, comprising:
   radio transceiver circuitry to:
      provide wireless service associated with first, second, and third networks,
         the first network being associated with a licensed frequency band,
         the second network being associated with a shared frequency band, and
         the third network being associated with an unlicensed frequency band;
   a memory device storing a set of processor-executable instructions; and a processor configured to execute the processor-executable instructions, wherein executing the processor-executable instructions causes the processor to:
  receive, from a user device that is attached to the first network, a carrier aggregation activation request;
  determine a load level associated with the second network;
  determine a load level associated with the third network;
  determine a priority access license ("PAL") of the user device, the PAL indicating a level of priority of the user device, with respect to access to the second network;
  select either the second network or the third network, based on:
    the respective load levels associated with the second and third networks, and
    the PAL of the user device; and
  output, to the user device, an indication that the carrier aggregation activation request has been approved, the indication further indicating for which network, of the second or third network, the carrier aggregation activation request has been approved.

2. The system of claim 1, wherein the first network is a Long-Term Evolution ("LTE") network, wherein the second network corresponds to a shared spectrum associated with the LTE network, and wherein the third network corresponds at an unlicensed spectrum associated with least one of an LTE-Unlicensed ("LTE-U") radio access technology ("RAT") or an LTE-Licensed Assisted Access ("LTE-LAA") RAT.

3. The system of claim 1, wherein executing the processor-executable instructions, to determine the load level associated with the third network, further causes the system to:
  receive signal strength measurements from one or more user devices connected via the third network; and
  determine the load level associated with the third network based on a quantity of the signal strength measurements received from the one or more user devices connected via the third network.

4. The system of claim 1, wherein executing the processor-executable instructions further causes the system to:
  determine that the PAL, associated with the user device, is of a lower priority than a top priority PAL,
  wherein the selecting between the second and third networks is performed based on determining that the PAL, associated with the user device, is of a lower priority than the top priority PAL.

5. The system of claim 4, wherein executing the processor-executable instructions further causes the system to:
  determine that one or more devices, that have a higher priority PAL than the PAL of the user device, are connected to the second network; and
  select the third network, based on the determination that the second network is being used by one or more devices that have the higher priority PAL.

6. The system of claim 1, wherein executing the processor-executable instructions, to select the second network or the third network, further causes the system to:
  compare the load level, associated with the second network, to the load level associated with the third network; and
  select the particular network, of the second and third networks, that is associated with the lower load level.

7. The system of claim 1, wherein executing the processor-executable instructions, to select the second network or the third network, further causes the system to:
  compare the load level, associated with the second network, to a threshold load level;
  select the second network when the load level, associated with the second network, exceeds the threshold load level; and
  select the third network when the load level, associated with the second network, does not exceed the threshold load level.

8. The system of claim 1, wherein executing the processor-executable instructions, to select the second network or the third network, further causes the system to:
  compare the load level, associated with the third network, to a threshold load level;
  select the second network when the load level, associated with the third network, exceeds the threshold load level; and
  select the third network when the load level, associated with the third network, does not exceed the threshold load level.

9. A method, comprising:
  providing, by one or more base stations of a wireless telecommunications network, first, second, and third radio access networks ("RANs"),
    the first RAN being associated with a licensed frequency band,
    the second RAN being associated with a shared frequency band, the second RAN being associated with a plurality of tiers,
      wherein a device, that holds a highest tier priority access license ("PAL"), is entitled to preferred access to the second RAN,
      wherein devices, that hold lower than the highest tier PALs, are entitled to less preferred access to the second RAN than devices that hold the highest tier PAL, and
    the third RAN being associated with an unlicensed frequency band;
  determining, by one or more devices associated with the one or more base stations, a load level associated with the second network;
  determining, by the one or more devices, a load level associated with the third network;
  determining, by the one or more devices, which tier, of the plurality of tiers, corresponds to a PAL of a particular user device;
  selecting, by the one or more devices, a particular network, of the second network or the third network, based on:
    the respective load levels associated with the second and third networks, and
    the determined tier, to which the PAL of the particular user device corresponds; and
  outputting, to the particular user device and via the one or more base stations, an instruction to attach to the particular selected network, of the second and third networks.

10. The method of claim 9, wherein determining the load level, associated with the third network, includes:
  receiving signal strength measurements from one or more user devices connected via the third network; and
  determining the load level associated with the third network based on a quantity of the signal strength measurements received from the one or more user devices connected via the third network.

11. The method of claim 9, further comprising:
determining that the PAL, associated with the user device, corresponds to a lower tier than the highest tier, of the plurality of tiers,
wherein the selecting between the second and third networks is performed based on determining that the PAL, associated with the user device, is of a lower tier than the highest tier.

12. The method of claim 11, wherein the PAL, associated with the user device, is a lowest tier PAL, of the plurality of tiers.

13. The method of claim 9, wherein selecting the second network or the third network includes:
comparing the load level, associated with the second network, to the load level associated with the third network; and
selecting the particular network, of the second and third networks, that is associated with the lower load level.

14. The method of claim 9, wherein selecting the second network or the third network includes:
comparing the load level, associated with the second network, to a threshold load level;
selecting the second network when the load level, associated with the second network, exceeds the threshold load level; and
selecting the third network when the load level, associated with the second network, does not exceed the threshold load level.

15. The method of claim 9, wherein selecting the second network or the third network includes:
comparing the load level, associated with the third network, to a threshold load level;
selecting the second network when the load level, associated with the third network, exceeds the threshold load level; and
selecting the third network when the load level, associated with the third network, does not exceed the threshold load level.

16. A non-transitory computer-readable medium storing a set of processor-executable instructions, wherein executing the processor-executable instructions causes one or more devices, which comprise one or more processors, to:
receive, from a user device that is attached to a first network provided by the one or more devices, a carrier aggregation activation request, the first network being associated with a licensed frequency band;
determine a load level associated with a second network provided by the one or more devices, the second network being associated with a shared frequency band;
determine a load level associated with a third network provided by the one or more devices, the third network being associated with an unlicensed frequency band;
determine a priority access level ("PAL") of the user device, the PAL indicating a level of priority of the user device, with respect to access to the second network;
select either the second network or the third network, based on:
the respective load levels associated with the second and third networks, and
the determined PAL of the user device; and
output, to the user device, an indication that the carrier aggregation activation request has been approved, the indication further indicating that the carrier aggregation activation request has been approved for the selected one of the second network or the third network.

17. The non-transitory computer-readable medium of claim 16, wherein the processor-executable instructions, to determine the load level associated with the third network, further include processor-executable instructions to:
receive signal strength measurements from one or more user devices connected via the third network; and
determine the load level associated with the third network based on a quantity of the signal strength measurements received from the one or more user devices connected via the third network.

18. The non-transitory computer-readable medium of claim 16, wherein the processor-executable instructions further include processor-executable instructions to:
determine that the PAL, associated with the user device, is of a lower priority than a top priority PAL,
wherein the selecting between the second and third networks is performed based on determining that the PAL, associated with the user device, is of a lower priority than the top priority PAL.

19. The non-transitory computer-readable medium of claim 18, wherein the PAL, associated with the user device, is a lowest priority PAL, with respect to the second network.

20. The non-transitory computer-readable medium of claim 16, wherein executing the processor-executable instructions, to select the second network or the third network, further include processor-executable instructions to:
compare the load level, associated with the second network, to the load level associated with the third network; and
select the particular network, of the second and third networks, that is associated with the lower load level.

* * * * *